United States Patent [19]
Massar

[11] 3,720,847
[45] March 13, 1973

[54] POWER CURRENT CRYOTRON WITH FLAT GATE CONDUCTOR

[75] Inventor: Ernst Massar, Erlangen, Germany

[73] Assignee: Siemens Aktiengesellschaft, Berlin, Germany

[22] Filed: Oct. 13, 1971

[21] Appl. No.: 188,912

Related U.S. Application Data

[63] Continuation-in-part of Ser. Nos. 805,701, March 10, 1969, abandoned, and Ser. No. 805,606, March 10, 1969, abandoned.

[30] Foreign Application Priority Data

March 12, 1968 Germany ....................P 12 88 701.3
March 15, 1968 Germany ....................P 16 39 427.7

[52] U.S. Cl. ..............307/245, 174/DIG.6, 307/306, 336/DIG. 1

[51] Int. Cl. ..........................................H03k 17/00

[58] Field of Search ..........307/245, 306; 174/DIG. 6; 335/216; 336/DIG. 1

[56] References Cited

UNITED STATES PATENTS

| | | | |
|---|---|---|---|
| 3,310,767 | 3/1967 | Buchhold | 307/245 |
| 3,335,295 | 8/1967 | Klinkhamer | 307/306 |
| 3,453,449 | 7/1969 | Kafka | 307/245 |
| 3,470,461 | 9/1969 | Morse | 307/245 |
| 3,470,508 | 9/1969 | Donadieu et al. | 335/216 |

*Primary Examiner*—John Kominski
*Assistant Examiner*—Darwin R. Hostetter
*Attorney*—Arthur E. Wilfond et al.

[57] ABSTRACT

A power current cryotron comprises an insulating carriage structure and a flat gate conductor of superconducting material on the carrier. The gate conductor may form continuous flat winding turns beside one another on the carrier. The winding turns are distributed along the carrier for substantially uniform magnetic field strength along the predominant portion of the gate conductor length. The conductor may be of meander configuration so that during operation of the cryotron adjacent portions of the conductor conduct current in opposite directions.

25 Claims, 12 Drawing Figures

POWER CURRENT CRYOTRON WITH FLAT GATE CONDUCTOR

This is a continuation-in-part of application Ser. No. 805,701, filed Mar. 10, 1969 for Power Current Cryotron with Flat Gate Conductor and of application Ser. No. 805,606, filed Mar. 10, 1969 for Power Current Cryotron, both now abandoned.

The present invention relates to a power current cryotron. More particularly, the invention relates to a power current cryotron with a flat gate conductor.

Superconductors tend to lose their superconductivity at a specific magnetic field intensity, although the temperature may be far below the critical value for superconductance. This is described in a periodical entitled "Electrie," Issue 12, 1964, pages 401 to 407. This fact has been utilized in the construction of a type of switch called a cryotron "Cryogenics," Aug. 1964, pages 212 to 217). A cryotron is a circuit component having a gate conductor which comprises superconducting material. The cryotron may be switched, via a magnetic field, from a superconducting to a normal conducting condition. Cryotrons are utilized in low current systems, preferably in calculating or accounting equipment, as logical components ("Forschung und Fortschritte," Volume 35, 1961, pages 138 to 142).

Current may flow without resistance in a cryotron up to a specific magnitude, as long as the gate conductor remains superconductive. A winding which conducts a control current, which winding may comprise a conductor, is called the control conductor. The control conductor is positioned in operative proximity with the gate conductor and produces a magnetic field which is combined with the magnetic field produced by the current flowing through the gate conductor. When the combined magnetic field exceeds the critical value $H_c$ of the gate conductor, said gate conductor becomes normally conducting. Since the voltages in substantially pure superconducting circuits are only in the order of millivolts, the gate conductor, which has become normally conducting, substantially disconnects the current because of its ohmic resistivity. Cryotrons have been tested with rectifiers in superconducting circuits. In many cases, the control conductor, which conducts the control current, is not absolutely necessary. Normal conductance may be provided by the magnetic field of the gate conductor or by an additional current from a second circuit, conducted by said gate conductor.

In order to utilize cryotrons in low current systems, the switching velocity should be in the order of nanoseconds. When cryotrons are utilized in power current systems, they must meet further requirements. The cryotrons must have great current carrying capacity in a superconducting condition and be able to block a high voltage in a normal conducting condition, without entailing unsupportable losses. Thus, at the low operational temperature, the gate conductor of the cryotron must provide the greatest possible product of the critical current density in a superconducting condition and the resistivity in a normal conducting condition. It is possible to reduce the losses at a specific switching capacity by extending the length of the circuit path. In a known power current cryotron, an appropriately long superconducting band is bifilarly positioned and folded within a winding. This device is unsatisfactory, however, since it provides only a low current carrying capacity and therefore only a low switching capacity.

The cryotron of the present invention is a power current cryotron which may be utilized in power circuits, and more particularly for the transfer of power in order to switch high currents and voltages. This type of cryotron must have a gate conductor of very considerable length in order to insure that after the cryotron conductor reaches the condition of normal conductivity, the residual current is so low that the conductor will not be destroyed. In order to keep the length of the gate conductor of the cryotron within acceptable limits, an extremely thin layer of superconducting material is required. The thickness of the layer of superconducting material is preferably not much greater than the depth of penetration of the magnetic field into the conductor material in a superconducting condition. Layers of such thickness, which are usually below 0.1 micrometer in thickness, may be placed on an insulating substrate. The substrate may comprise any suitable electrical insulating material such as, for example, glass, porcelain or synthetic material such as plastic. A metal substrate may be utilized if it is provided with a coating of electrical insulating material such as, for example, varnish. The superconducting layer is then precipitated upon the electrical insulating coating. This construction is effective only if it prevents the occurrence of a magnetic field in the metal.

The conductor or cryotron must be positioned in a manner whereby the same magnetic field intensity is provided along said conductor. Otherwise, when the magnetic field is increasing, the normal conductance would occur too soon locally and would probably destroy the conductors.

The principal object of the present invention is to provide a new and improved power current cryotron.

An object of the present invention is to provide a power current cryotron which overcomes the disadvantages of known cryotrons.

An object of the present invention is to provide a power current cryotron which functions with efficiency, effectiveness and reliability.

In accordance with the present invention, in one embodiment, the cryotron is provided with a gate conductor in the form of continuous flat helices wound beside one another and positioned on an insulated carrier in a manner whereby the same magnetic field intensity prevails along the greater portion of the gate conductor length during current flow. The mutually adjacent helical strips are so spaced from each other that the total magnetic field configuration is not disturbed sufficiently to cause a considerable reduction in the current-carrying capacity of the gate conductor.

In a particularly preferred embodiment of the present invention, the gate conductor comprises a helix composed of flat strips. The gate conductor has a rectangular cross-section and is very long relative to its width. The strip portions corresponding to the longer rectangular sides of the cross-section are supported by supporting walls of insulating material. This helix can be compared with a tape-wound coil in which the tape face is parallel to the axis of the coil.

The supporting walls may form a gap between two walls or may constitute the sides of a wall. The walls may be flat plates or, most advantageously, cylinder housings, especially concentric or coaxial cylinder housings. The superconducting material of the strip-shaped gate conductors is preferably placed on insulating tapes comprising, for example, synthetic material, which are then positioned in the desired helical or coil form. It is also advantageous to apply the superconducting material directly to the protective walls, as strips. The application of the strip may be, for example, by deposition by spraying or vapor deposition. When the gate conductor is positioned in a gap, it is preferable to provide abutments for the portions of the strip bridging the gap. Such portions are the shorter strip portions. The abutments bridge the gap and support the tape which in turn support the superconducting material.

The power current cryotron of the present invention utilizes superconducting material as the gate conductor for conducting the main current. Any suitable superconducting material such as, for example, lead, niobium, or a similar material having specific values for the critical magnetic field strength, may be utilized as the gate conductor. The superconducting material is applied in extremely thin layers, usually less than 1 micrometer in thickness, on electrically insulating carrier material.

The gate conductors conducting the main current are acted upon either by the magnetic field produced by the main current through the gate conductor alone, or by the combination of said magnetic field and the magnetic fields produced by outside influences, such as adjacent conductors which either also conduct the main current or conduct entirely, or in part, a current which can possibly be controlled, as in a control conductor, and which does not depend upon the main current. This results in the fact that when the gate conductor exceeds the critical field intensity value, said gate conductor becomes normally conducting and acquires such high resistance that it considerably decreases the main current. The control conductors are preferably positioned as closely as possible and in parallel with the gate conductors, but said gate conductors and said control conductors are insulated from each other. In the cryotron of the present invention, the gate conductor strips may preferably also be mounted on plates comprising synthetic material.

In accordance with the present invention, strips of superconducting material are provided as gate conductors and serve to conduct the main current of the cryotron, as hereinbefore described. The strips may be wound in the form of helices or winding turns around the wall of a cylinder of insulating material. The strips are wound in a manner whereby they extend along the surfaces of the cylinder housing almost in parallel with the cylinder axis and are connected via the front sides of the cylinder housing, thereby providing successive windings. All the strips are then connected in series and all have the same current direction on one surface of the housing. The total magnetic flux of all the strips is so adjusted to the length of the magnetic flux along the periphery of the cylinder, that when the desired operating current for the cryotron is attained, the critical value of the magnetic field strength will prevail in all the strips.

The gate conductor strips comprising superconducting material are preferably positioned on the mutually facing housing surfaces of two preferably concentric cylinders of insulating material. The cylinders are connected by brackets comprising superconducting material. Thus, there is no solid insulating material in the space occupied by the magnetic field and said space may be occupied by coolant. This embodiment is especially preferred, from a technical point of view, since during the flow of current, the helical strips brace tightly against the cylinder walls due to the magnetic field which is produced between the cylinders, and therefore cannot expand. The arrangement is therefore very stable. The same advantage is also obtained when the helix is positioned in the gap between walls formed differently from those indicated such as, for example, between flat or planar plates.

In accordance with the present invention, a power current cryotron comprises an insulating carrier structure. A flat gate conductor of superconducting material has a thickness in the order of magnitude of the depth of magnetic field penetration in the material and forms continuous flat winding turns beside one another on the insulating carrier structure and distributed along the carrier for substantially uniform magnetic field strength along the predominant portion of the gate conductor length. The winding turns of the gate conductor of superconducting material are spaced from each other the distance at which the configuration of the resulting total magnetic field is close to, but still insufficient to cause the threshold disturbance at which the current carrying capacity is impaired.

The gate conductor comprises a flat strip and the winding turns of the gate conductor form conjointly a helix of a generally rectangular cross-sectional shape whose longitudinal side portions are long as compared with the transverse side portions. The carrier structure comprises supporting walls and the longitudinal side portions of the strips are held by the supporting walls. The carrier structure may comprise an insulating strip on which the gate conductor turns are mounted. The carrier structure may comprise two wall members spaced from each other in generally parallel relation and forming with each other a gap space between them for cryogenic medium. The winding turns of the gate conductor then form conjointly a helix of a generally rectangular cross-sectional shape whose longitudinal side portions extend along and in contact with the respective wall members in the gap space. The two wall members may be cylindrical and arranged in coaxial relation to each other. The substantially rectangularly shaped winding turns have the transverse side portions shorter than the longitudinal side portions and consist of superconducting material of a higher critical field strength than that of the longitudinal portions. The carrier structure may comprise a cryogenic vessel wall and the winding turns of the gate conductor form conjointly a helix of a generally rectangular cross-sectional shape whose longitudinal side portions lie flat against respectively opposite faces of the wall.

The carrier structure may comprise a planar plate. The winding turns of the gate conductor are then of generally rectangular shape and wound about the plate, the flat sides of the turns facing the plate. The gate conductor is formed at each end of the carrier plate as a tube coated with an outer layer of superconducting material. The tubular ends of the gate conductor extend at least over one turn of the winding. The superconducting material of the tube coatings has a higher critical magnetic field strength than the material of the other winding turns.

The cryotron may further comprise a control conductor of normal conductivity or a superconducting control conductor. The carrier structure forms a partitioning wall and the winding turns of the gate conductor are mounted on one side and the control conductor on the other side of the wall.

In accordance with another embodiment of the invention, the cryotron is provided with a gate conductor in the form of superconducting layer on a tubular insulating member. The tubular insulating member and the superconducting layer are of meander configuration so that during operation of the cryotron adjacent portions of the layer conduct current in opposite directions. This provides a power current cryotron with a layer type gate conductor superconducting layer having a thickness in the order of magnitude of the depth of penetration of a magnetic field into the superconducting layer.

The insulating member may comprise insulating material of cylindrical configuration or a tube of cylindrical configuration coated with insulating material. The diameter of the tube is such that the critical field intensity is provided at an arbitrary current greater than the normal current. The relation $$H_c = I \sqrt{2}/D\pi$$

where $H_c$ is the critical field intensity, $I$ is the effective current intensity of a sinusoidal alternating current and $D$ is the diameter of the insulating tube of the gate conductor.

In the cryotron of the present invention, the superconducting material utilized to conduct the current of the gate conduct may comprise any suitable material such as, for example, lead, niobium, or similar material, having characteristic values for the critical magnetic field intensity. The superconducting material is deposited in extremely thin layers, which are generally less than 1 micrometer in thickness, precipitated upon the insulating material. The gate conductors, which conduct the main current of the cryotron, are subjected to either the magnetic field produced by the main current through the gate conductor or by the combination of said magnetic field and a magnetic field produced by another source such as, for example, adjacent conductors through which the main current flows or which completely or partly conducts a control current which is independent of the main current and which may be controlled. This results in the gate conductor becoming normal conducting and providing such high resistance that the main current decreases considerably when the critical field intensity magnitude is exceeded.

In the power current cryotron of the present invention, the superconducting layers functioning as the gate conductors of the main current may be provided on a tube or tubes of insulating material having a diameter which is such that the critical field intensity occurs at a specific, permissible maximum current. The layers of superconducting material may comprise a plurality of spaced parallel strips extending parallel to the axis of the insulating tube or tubes and uniformly distributed on or around such tube or tubes. This functions to increase the resistance in the normal conducting condition. The space or distance between the axially extending strips is determined by the fact that the configuration of the magnetic field produced by the superconducting layer may not be disturbed in a discernible manner. The tube of insulating material may also be completely covered with a layer of superconducting material. The meander configuration of the superconducting layer is such that adjacent portions of the layer conduct current in opposite directions. The cryotron of the present invention is preferably housed in a cryostat comprising synthetic material.

Control conductors may be provided in the cryotron of the present invention in order to provide a response, at normal conductance, at any desired gate conductor current. The control conductors are connected in corresponding control circuits and are positioned as closely as possible and in parallel with the gate conductors, but are insulated therefrom. In a preferred embodiment of the invention, the insulating member of the gate conductor is of tubular configuration and the insulating member of the control conductor is of tubular configuration having a smaller diameter than that of the gate conductor tube. The control conductor tube is coaxially positioned inside and spaced from the gate conductor tube in a manner whereby the control conductor is not influenced by the magnetic field produced by the gate conductor.

The gate conductor may be arranged on an insulating plate or plates comprising any suitable electrically insulating material such as, for example, synthetic or plastic material. The tubular insulating member and the superconducting layer on said member are then arranged in a meander spiral configuration on the insulating plate or plates. If a plurality of insulating plates is utilized, each of a plurality of superconducting layers is arranged on a corresponding one of the insulating plates and the layers are in continuous connection with each other. The portions of the superconducting layers which connect said layers of different insulating plates to each other are of greater diameter than the remainder of the superconducting layer. These portions preferably comprise superconducting material having a higher critical field intensity than the remainder of the gate conductor layers. Furthermore, each of the insulating plates may be of hollow configuration and may be provided with a plurality of holes formed therethrough at points of contact of the corresponding layer with the insulating plate in a manner which permits free circulation of a coolant around the layer. The hollow insulating plates may then be immersed in a coolant such as, for example, liquid helium, so that if the gate conductor becomes critical, said coolant is readily provided. The coolant is supplied to the hollow plates via suitable conduits.

In accordance with the present invention, the superconducting layer may comprise spaced parallel tubular portions and bridge tubular portions of greater diameter than the parallel portions joining adjacent ones of the parallel portions to each other at one corresponding end of each of the parallel portions to provide a continuous layer. There is then provided a tube of cylindrical configuration consisting of or coated with insulating material or a plurality of tubes coaxially positioned one within the other. The tubular superconducting layer is provided on the cylindrical surface of the tube or each of the tubes. The bridge portions of the superconducting layer are preferably of superconducting material having a higher critical magnetic field intensity than the parallel portions of said superconducting layer. The superconducting layer may be provided on either the inner or the outer cylindrical surface of the insulating tube.

In order to prevent adjacent gate conductors from influencing each other, such gate conductors may be shielded from each other by strips extending parallel to the axis of the insulating tube. The shielding strips may comprise any suitable superconductor material such as, for example, niobium or similar superconducting material having the highest possible critical field intensity magnitude. The shielding effect may also be provided by control conductors comprising superconducting material positioned between adjacent gate conductors.

In order that the present invention may be readily carried into effect, it will now be described with reference to the accompanying drawings, wherein:

FIG. 1 is a perspective schematic diagram of an embodiment of the cryotron of the present invention;

FIG. 1*a* is a sectional view of part of the cryotron of FIG. 1;

Figure 4:
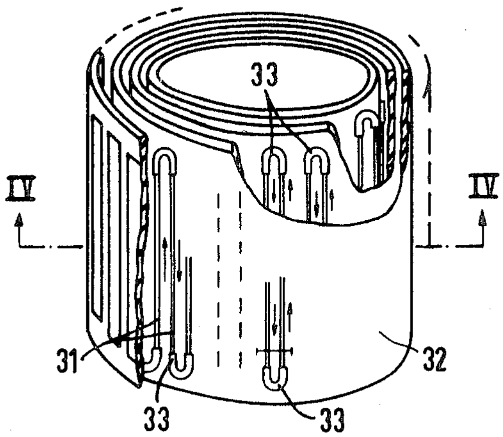
FIG. 4 is a perspective diagrammatic presentation, partially cut away, of still another embodiment of the cryotron of the present invention.
Figure 7A:
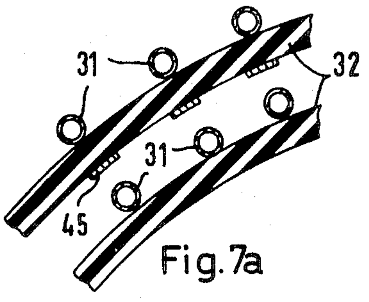
Figure 7B:
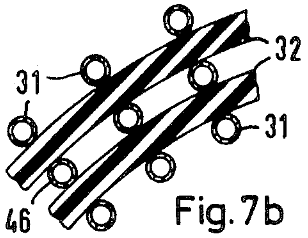
Figure 8:
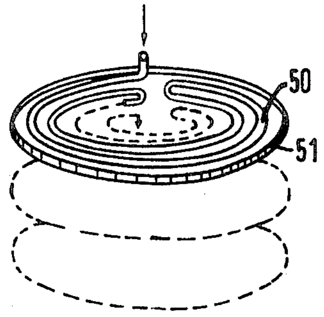
Figure 9:
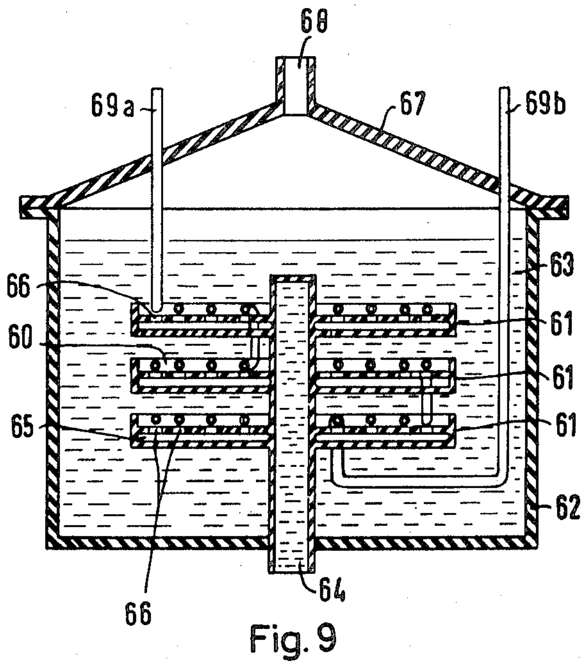
Figure 10:
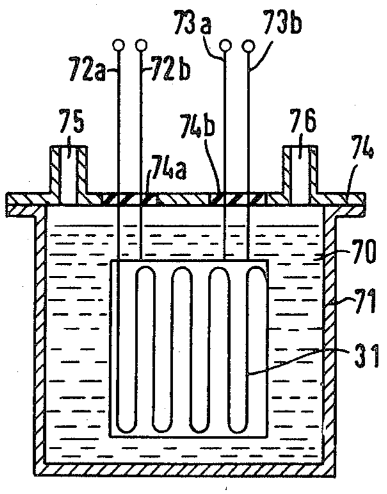

FIG. 7*a* is a partial sectional view taken along the lines IV—IV of FIG. 4 and modified;

FIG. 7*b* is a partial sectional view taken along the lines IV—IV of FIG. 4 and modified;

FIG. 8 is a perspective view of yet another embodiment of the cryotron of the present invention;

FIG. 9 is a view, partly in section, of the embodiment of FIG. 8 in a cryostat; and FIG. 10 is a view, partly in section, of the embodiment of FIG. 4 in a cryostat.

In the FIGS., the same components are identified by the same reference numerals.

Figures 1, 1A, 2, 3:
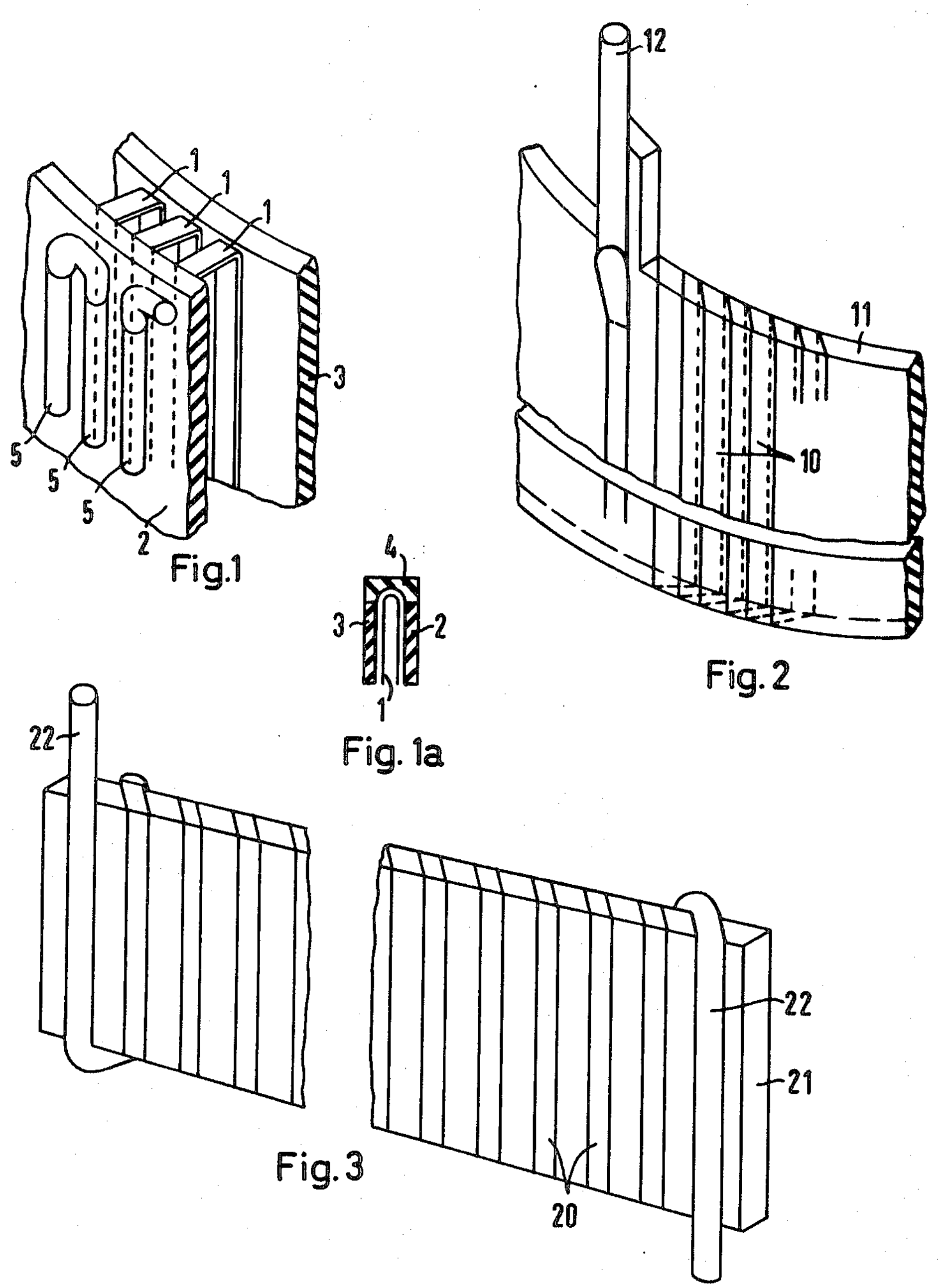
FIG. 2 is a perspective schematic diagram of a portion of another embodiment of the cryotron of the present invention.
FIG. 3 is a perspective schematic diagram of a modification of the embodiment of FIG. 2.

In the embodiment of FIG. 1, the gate conductor is positioned in a gap between two walls. The gate conductor strip 1 of superconducting material has a thickness which is preferably less than 1 micrometer. The gate conductor strip 1 is supported on the inner cylindrical surface of a cylinder 2 and on the outer cylindrical surface of a coaxial concentric cylinder 3. Each of the cylinders 2 and 3 comprises electrically insulating material. The portion of the gate conductor strips 1 on the cylinder 3 conducts the cryotron main current in one direction and the portion of said gate conductor strips on the cylinder 2 conducts said current in the opposite direction.

In the arrangement of the gate conductors shown in FIG. 1, the magnetic field is only in the gap space, or gap space between the walls, and at each point the magnetic field is tangential to the surface of the wall. The gap or space between the walls is filled with liquid coolant such as, for example, helium, which has only slight dielectric losses relative to the weak electrical field intensities.

The gate conductor strip 1 of FIG. 1 is preferably placed upon a tape or band. A tape of any suitable insulating material such as, for example, synthetic material, may be utilized. At least one surface of the tape should be covered or coated by a layer of superconducting material.

It is preferable to support the portions of the gate conductor strip 1 which bridge the gap. A flat plate extending across the gap may be utilized for this purpose. A sealing member 4, as shown in FIG. 1*a*, may be utilized to bridge the gap between the walls 2 and 3. A notch, groove or recess may be formed in the under surface of the sealing member 4 to accommodate the tape 1 and to prevent buckling of said tape (FIG. 1*a*). The groove in the sealing member 4, which may be of any suitable configuration, may, in the illustrated embodiment of FIG. 1, be a half torus, sectioned in parallel to the axis of the torus.

In the embodiment of FIG. 2, a single cylinder 11 of insulating material is utilized as a carrier for the superconducting strips 10, instead of the cylinders 2 and 3 of the embodiment of FIG. 1. This facilitates production of the cryotron. The cylinder 11 occupies the space occupied by the magnetic field. In this instance, the dielectric losses of most solid insulating materials are somewhat higher and helium evaporation is somewhat stronger than when the gap or space is filled with liquid helium. However, the gate conductor strips 10 of FIG. 2 are more easily and simply produced than those of FIG. 1.

The cylinder housing 11 of FIG. 2, as well as the two cylinder housings 2 and 3 of FIG. 1, may be assumed to be sectioned in parallel to the axis thereof and bent or circular in a plane perpendicular to said axis. FIG. 3 is a modification of the embodiment of FIG. 2. In FIG. 3, the carrier is a planar or flat plate 21. The gate conductor strip 20 is preferably placed on a tape of synthetic material and is wound with said tape around the carrier plate 21 in helical configuration. The gate conductor strip 20 may be directly provided by vapor deposition, corona discharge, electrolysis, or the like.

A cryotron of the embodiment of FIG. 1 may also have flat, instead of cylindrical, walls, as the modification of FIG. 3. In any case corresponding to the modification of FIG. 3, it is most preferable to provide each end of at least the gate conductor 20 on the plate or plates in the configuration of a tube 22. The tubes 22 are provided with a superconducting layer and have a diameter which is such that a premature normal conductance condition is certainly prevented. A material is therefore advantageously utilized for the tubular superconductor layers 22 which has a higher critical value for the magnetic field strength than the rest of the gate conductor strip 20 material.

The magnetic field is deflected at the ends of the plate-shaped cryotron of FIG. 3. Each end loop of the gate conductor 20 is therefore positioned in an area of strong magnetic field curvature and higher magnetic field intensity. In each of the disclosed embodiments, the deformation of the magnetic field between the strips 20 is negligibly small in relation to the strip distances, as hereinbefore discussed.

The critical field strength $H_c$ in embodiments involving circular symmetry, as shown in FIGS. 1 and 2, is determined by the number of windings $z/2$ and by the total length of the circular magnetic path $D\pi$, where $z$ is the total number of strips.

$$H_c = zI_c \quad \sqrt{2}/2D\,\pi$$

$I_c$ is the critical current. Thus, a relatively uniform distribution of the gate conductor strips must be assumed. When a gate conductor is positioned on a planar surface, as in FIG. 3, the critical field strength is provided at a current which is 20 to 50 percent greater than that in the embodiments of FIGS. 1 and 2. This is due to the fact that the magnetic field lines close across the space.

In the cylindrical carrier embodiment of FIG. 2, the current leads 12 at the ends of the gate conductor 10 are preferably spaced a greater distance from the next adjacent strips of said gate conductor than the other adjacent strips of said gate conductor are spaced from each other. This reliably prevents flash-over voltages. A premature occurrence of normal conductivity at the ends of the gate conductor 10 of the cryotron is preferably prevented by providing a tube having a superconducting layer thereon as each current lead 12 at the ends of said gate conductor. Although this is illustrated only in the embodiment of FIG. 2, it is preferably provided for the other embodiments of the invention as well.

If the cryotron response is to be controlled, control conductors 5 are provided on the outer cylindrical surface of the cylinder 2, as shown in FIG. 1, and on the inner cylindrical surface of the cylinder 3 (not shown in FIG. 1). The control conductors 5 are preferably provided in a manner whereby current flowing in adjacent control conductors is conducted in opposite directions. This maintains self-induction at a low level and thus permits a rapid increase in the control current.

The control conductors 5 may comprise any suitable superconducting material and preferably have the configuration of tubes. The control conductors 5 may also comprise a normal conducting material having a particularly small resistance at low temperatures. A suitable material of this type is, for example, aluminum of great purity. In essentially the same manner, the embodiments of FIGS. 2 and 3 may be provided with control conductors, if necessary.

In FIG. 4, the superconducting layer has a length which is generally greater than 1 kilometer at voltages of 100 kilovolts. An insulating tube 32 of cylindrical configuration comprises any suitable insulating material. The gate conductor superconducting layer is provided on the insulating tube 32 and is of meander configuration comprising spaced parallel linear tubular portions 31 and bridge tubular portions 33. The bridge portions 33 are of arcuate configuration and joint adjacent ones of the linear portions 31 to each other at one corresponding end of each of said linear portions to provide a continuous layer. The diameter of the bridge portions 33 is greater than that of the linear portions 31, in view of the critical field intensity. During operation of the cryotron, adjacent linear portions 31 of the superconducting layer conduct current in opposite directions, as shown by the arrows of FIG. 4. This limits the total inductivity to the smallest possible magnitude.

Figure 6:
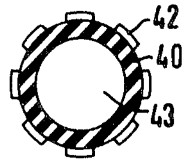
FIG. 6 is a sectional view of a gate conductor of another embodiment of the cryotron of the present invention.

If the resistance of the gate conductor must be relatively high when said gate conductor is in the normal conducting condition, it is preferable to provide the superconducting layer on the cylindrical surface of a tubular insulating member 40 in the form of spaced parallel strips 42 extending parallel to the axis 43 of said tubular insulating member and uniformly distributed around said tubular insulating member, as shown in FIG. 6. In this manner, only a part such as, for example, two-thirds of the cylindrical surface of the tubular insulating member 40 is covered by the superconducting layer 42. The configuration of the magnetic field around the gate conductor is not markedly changed thereby.

Figure 5:
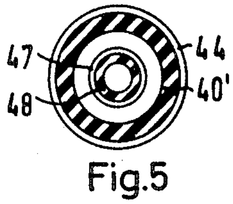
FIG. 5 is a sectional view of a gate conductor of another embodiment of the cryotron of the present invention.

In FIG. 5, the insulating member is in the configuration of a tube 40′ of the insulating material and the superconducting layer 44 is a layer of superconducting material completely covering the outer cylindrical surface of said insulating tube.

A plurality of insulating tubes 32 may be utilized in the power current cryotron, as shown in FIG. 4. The different cylindrically-shaped insulating tubes 32 are coaxially positioned around each other in the embodiment of FIG. 4. Each of the insulating tubes 32 has a superconducting layer on a tubular insulating member of meander configuration arranged on its outer cylindrical surface. The meander configuration of the superconducting layer permits an adequate length of said superconducting layer to be accommodated in a relatively small area. In order to prevent the gate conductor superconducting layers of adjacent insulating tubes 32 from influencing each other, a plurality of shielding strips 45 may be provided on the inner cylindrical surface of the outer one of said adjacent insulating tubes, as shown in FIG. 7a. The shielding strips 45 comprise superconducting material of any suitable type having a suitably high critical field strength such as, for example, niobium.

The cryotron of the present invention may also be provided with a control conductor, as shown in FIGS. 5 and 7b. The control conductor 46 conducts control current and is in spaced parallel relation to the gate conductor, indicated in FIGS. 7b as the linear portions 31 of the superconducting layer. In the embodiment of FIG. 7b, the control conductor 46 is of the same configuration as the gate conductor represented by the linear portion 31. The control conductor 46 is interposed between adjacent insulating tubes 32 and thus functions as a shielding member. The control conductor 46 comprises any suitable superconducting material.

In the embodiment of FIG. 5, the control conductor may comprise a tubular insulating member 48 and a superconducting layer 47 on said insulating member. The insulating tubes 40′ and 48 are coaxially positioned, one around the other, in spaced radial relationship.

In the embodiment of FIG. 8, there is provided an insulating plate or a plurality of plates 51. The gate conductor superconducting layer 50 is positioned on each insulating plate 51. The insulating plates 51 may be positioned in coaxial, vertically spaced, horizontal position. The superconducting layer 50 provided on a tubular insulating member is of meander spiral configuration on each insulating plate 51. The superconducting layers 50 of the individual insulating plates 51 are connected to each other to form a continuous superconducting layer 50. An adequate length may be provided for the gate conductor 50 by providing a suitable number of insulating plates 51. The superconducting layer 50 may be replaced by strips of superconducting material as in the embodiment of FIG. 6.

Each of the insulating plates 51 of the embodiment of FIG. 8 is preferably of hollow configuration to enable a coolant such as, for example, liquid helium, to be circulated therein immediately after the gate conductor resistance reaches that of normal conductivity, in order to provide the most rapid possible cooling of the gate conductor and to restore superconductivity. Insulating plates of hollow configuration of the type of the embodiment of FIG. 8 are illustrated in a cryostat in FIG. 9.

In FIG. 9, a gate conductor 60 is provided on a plurality of insulating plates 61, each of which insulating plates is hollow. The insulating plates 61 are positioned in a synthetic cryostat 62 filled with liquid helium 63. Liquid helium is supplied to the hollow interiors 65 of the insulating plates 61 via a duct or tube 64.

A plurality of holes 66 are formed through each of the insulating plates 61 at points of contact of the corresponding superconducting layer 60 with said insulating plate in a manner which permits free circulation of the coolant 63 around said layer. The coolant supplied via the duct 64 flows through the holes 66 in the insulating plates 61 thereby providing cooling circulation for the gate conductor 60. The helium which evaporates during the operation of the cryotron is removed via an exhaust duct 68 provided in the cover 67 of the cryostat. The gate conductor 60 has two ends **69*a* and 69*b* which extend through the cover 67** of the cryostat.

FIG. 10 illustrates the cryotron of the embodiment of FIG. 4 of the present invention in a cryostat 71. The cryostat is filled with liquid helium 70 which functions as the coolant. The gate conductor 31 has a pair of ends **72*a* and 72*b* and the control conductor 46 of the modification, shown in FIG. 7*b*, has a pair of ends, 73*a* and 73*b*. The ends 72*a*, 72*b*, 73*a* and 73*b* extend through insulating plugs 74*a* and 74*b* in the cover 74 of the cryostat 71**.

An input duct 75 is provided in the cover 74 of the cryostat 71 for providing the liquid helium 70. An exhaust duct 76 is provided in the cover 74 of the cryostat 71 for removing evaporated helium. The cryotron remains immersed completely in the liquid helium 70 during operation.

While the invention has been described by means of specific examples and in specific embodiments, I do not wish to be limited thereto, for obvious modifications will occur to those skilled in the art without departing from the spirit and scope of the invention.

I claim:

1. A power current cryotron comprising an insulating member and a layer type gate conductor superconducting layer on the insulating member, said layer having a thickness in the order of magnitude of the depth of penetration of a magnetic field into the superconducting layer, said insulating member and said layer being of meander configuration so that during operation of said cryotron adjacent portions of said layer conduct current in opposite directions.

2. A power current cryotron comprising a tubular insulating member having an axis and a layer type gate conductor superconducting layer on said insulating member, said layer having a thickness in the order of magnitude of the depth of penetration of a magnetic field into the superconducting layer, said insulating member and said layer being of meander configuration running in directions parallel to the axis of the tubular insulating member so that during operation of said cryotron adjacent portions of said layer conduct current in opposite directions.

3. A power current cryotron as claimed in claim 2, further comprising a tube of insulating material of cylindrical configuration, said tubular insulating member and said superconducting layer on said insulating member being arranged on the cylindrical surface of said tube.

4. A power current cryotron as claimed in claim 2, further comprising a tube of cylindrical configuration coated with insulating material, said tubular insulating member and said superconducting layer on said insulating member being arranged on the cylindrical surface of said tube.

5. A power current cryotron as claimed in claim 2, wherein said layer is in meander configuration having spaced parallel tubular portions and bridge tubular portions of greater diameter than said parallel portions joining adjacent ones of said parallel portions to each other at one corresponding end of each of said parallel portions to provide a continuous layer.

6. A power current cryotron as claimed in claim 2, wherein said tubular insulating member comprises an insulating tube having an axis and said layer comprises a plurality of spaced parallel strips extending parallel to the axis of said insulating tube and uniformly distributed around said insulating tube.

7. A power current cryotron as claimed in claim 2, comprising a plurality of concentric insulating tubes and a plurality of superconducting layers on tubular insulating members each being arranged on a corresponding one of said insulating tubes, each of said layers being of meander configuration.

8. A power current cryotron as claimed in claim 2, further comprising an insulating plate, said tubular insulating member and said superconducting layer on said insulating member being arranged in a meander spiral configuration on said insulating plate.

9. A power current cryotron as claimed in claim 2, further comprising a control conductor in spaced parallel relation to said gate conductor comprising another insulating member and another superconducting layer on said other insulating member.

10. A power current cryotron as claimed in claim 2, further comprising another superconducting layer.

11. A power current cryotron as claimed in claim 2, comprising a plurality of insulating plates and a plurality of superconducting layers on tubular insulating members each being arranged on a corresponding one of said insulating plates in a meander spiral configuration, said layers being in continuous connection with each other.

12. A power current cryotron as claimed in claim 11, further comprising a coolant, wherein each of said insulating plates is immersed in said coolant and is hollow and has a plurality of holes formed therethrough at points of contact of the corresponding layer with the insulating plate in a manner which permits free circulation of the coolant around said layer.

13. A power current cryotron as claimed in claim 12, further comprising coolant supply means for supplying coolant to said insulating plates.

14. A power current cryotron, comprising an insulating carrier structure having supporting walls, a flat gate conductor comprising a flat strip of superconducting material having a thickness in the order of magnitude of the depth of magnetic field penetration in said material, said gate conductor forming continuous flat winding turns beside one another on said insulating carrier structure and distributed along said carrier structure for substantially uniform magnetic field strength along the predominant portion of the gate conductor length, the winding turns of said gate conductor forming conjointly a helix of a generally rectangular cross-sectional shape whose longitudinal side portions are long as compared with the transverse side portions, the longitudinal side portions of said strip being held by said supporting walls.

15. A power current cryotron as claimed in claim 14, wherein the winding turns of said gate conductor of superconducting material are spaced from each other the distance at which the configuration of the resulting total magnetic field is close to, but still insufficient to cause the threshold disturbance at which the current carrying capacity is impaired.

16. A power current cryotron as claimed in claim 14, wherein the flat strip gate conductor comprises a superconductive layer on an insulated tape.

17. A power current cryotron as claimed in claim 14, wherein said carrier structure comprises two wall members spaced from each other in generally parallel relation and forming with each other a gap space between them for cryogenic medium, and the longitudinal side portions of the winding turns of said gate conductor extend along and in contact with the respective wall members in said gap space.

18. A power current cryotron as claimed in claim 14, wherein said carrier structure comprises a cryogenic vessel wall and the longitudinal side portions of the winding turns of said gate conductor lie flat against respectively opposite faces of said wall.

19. A power current cryotron as claimed in claim 14, said carrier structure comprising a planar plate, said winding turns of said gate conductor being wound about said plate, the flat sides of said turns facing said plate.

20. A power current cryotron as claimed in claim 14, wherein said carrier structure comprises a cylindrical wall member.

21. A power current cryotron as claimed in claim 14, further comprising a control conductor, said carrier structure forming a partitioning wall and having said winding turns of said gate conductor mounted on one side and said control conductor on the other side of said wall.

22. A power current cryotron as claimed in claim 17, wherein the transverse side portions of said substantially rectangularly shaped winding turns consist of superconducting material of a higher critical field strength than that of said longitudinal portions.

23. A power current cryotron as claimed in claim 17, wherein said two wall members are cylindrical and arranged in coaxial relation to each other.

24. A power current cryotron as claimed in claim 19, wherein said gate conductor is formed at each end of said carrier plate as a tube coated with an outer layer of superconducting material, the tubular ends of said gate conductor extending at least over one turn of said winding.

25. A power current cryotron as claimed in claim 24, wherein the superconducting material of said tube coatings has a higher critical magnetic field strength than the material of the other winding turns.

* * * * *